UNITED STATES PATENT OFFICE.

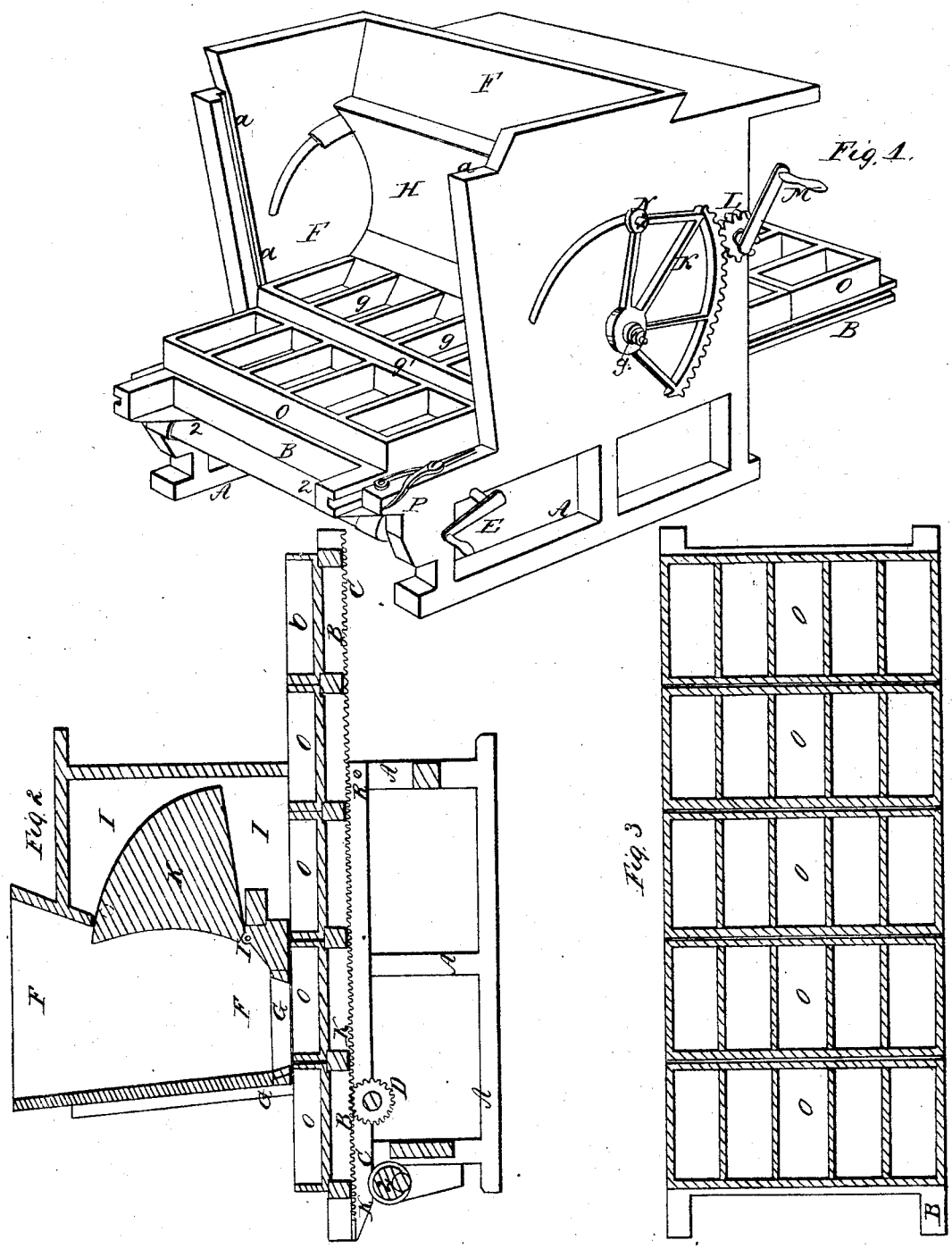

JOHN BOLTON, OF SARATOGA SPRINGS, NEW YORK.

MACHINE FOR MOLDING BRICKS.

Specification of Letters Patent No. 891, dated August 23, 1838.

*To all whom it may concern:*

Be it known that I, JOHN BOLTON, of Saratoga Springs, in the county of Saratoga and State of New York, have invented a new and Improved Machine for the Purpose of Molding Brick; and I do hereby declare that the following is a full and exact description thereof.

In the accompanying drawing, Figure 1, is a perspective view of the whole machine; Fig. 2, a vertical section thereof from front to back; and Fig. 3, a top view of the sets of molds, as sustained upon the carriage.

In each of the figures like parts are designated by the same letters of reference.

A, A, is the base, or frame upon which the machine rests.

B, B, is a carriage which is to support the molds, and which consists of a rectangular frame, having a toothed rack, C, C, extending along each of its side pieces. A shaft crosses the frame, and carries two pinions D, which gear into the racks and allow the carriage to be moved back and forth by means of the wrench E. The clay duly tempered in the ordinary way, is to be thrown into a hopper below which the carriage, and its molds, are to traverse. This hopper is marked F, F, the front of it being removed, as shown in Fig. 1, to exhibit its interior; the grooves which receive the front are shown at, a, a.

The bottom of the hopper consists of an open grating G, G, corresponding or nearly so, with the divisions of the molds, the divisions in the grating being smaller than the divisions in the molds into which the clay is to be forced. The bars constituting this grating, are made thin on their upper edges, the more readily to divide and distribute the clay. The clay is made to pass into the molds by means of a forcer H, which is made in a form nearly resembling a quarter of a cylinder, as shown in the section Fig. 2. This forcer turns upon gudgeons I, I, on each side of the machine. It is concave on the face as represented in the drawing.

To the gudgeons segment wheels K, are adapted, there being one such on each side of the machine. A shaft carrying pinions L, moved by the wrench M, crosses the machine at its rear; and by turning this shaft the forcer will be made to press upon the clay in the hopper, it being connected to the segment wheels by bolts, or pins at N, passing through circular openings in the sides of the hopper; when moved back, the forcer is received in the cavity J, J.

O, O, are the molds which rest upon the sliding frame B; these are placed and removed by proper assistants.

P, is a latch which catches into notches on the side of the carriage, to arrest it when a mold is in a proper situation for being filled. The front piece G', of the grating, operates as a striker, as the filled molds are moved from under the hopper. As it will sometimes happen that stones among the clay will obstruct the molds in being drawn out, the ways R, R, upon which the carriage is made to run, rest in front upon a shaft, Q, Q, which is hung eccentrically, or has one side cut away, to that when it is turned around, the ways and carriage will be allowed to drop sufficiently to allow it to pass out, and the obstructing piece to be removed. In using this machine, the carriage is run out in front, and the empty molds o, o, are placed upon it, as seen at Fig. 3. The carriage is then run back, until the front mold is under the hopper; it is then run forward, the forcer being at the same time made to press upon the clay, which will complete the molding.

What I claim as my invention is—

The construction and use of those parts of the machine which I have denominated the forcer and the eccentric roller, the same being constructed, combined, and connected with the other parts of the machine, substantially in the manner herein set forth.

JOHN BOLTON.

Witnesses:
P. K. MORSELL,
LINTON THORN.